July 26, 1949.  W. T. POSEY  2,477,347
HIGH-FREQUENCY REACTANCE TESTING APPARATUS
Filed April 30, 1946
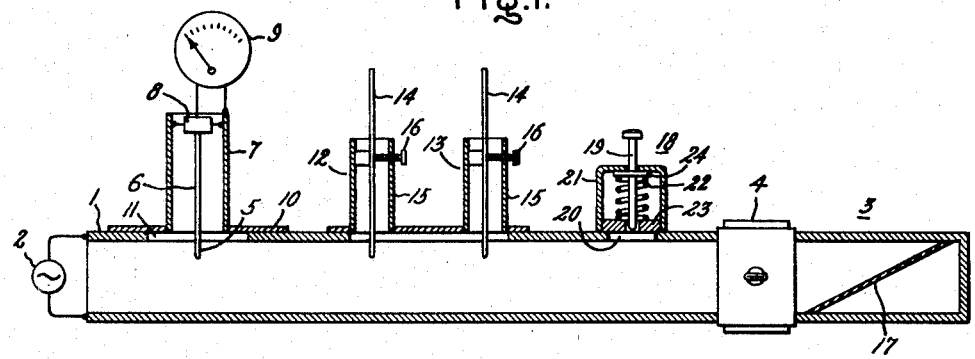
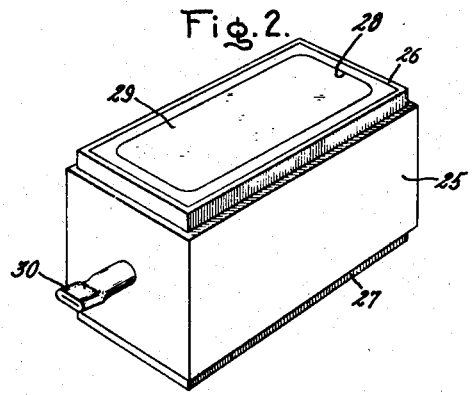
Inventor:
William T. Posey,
by Merton D Moose
His Attorney.

Patented July 26, 1949

2,477,347

UNITED STATES PATENT OFFICE 2,477,347

HIGH-FREQUENCY REACTANCE TESTING APPARATUS

William T. Posey, Schenectady, N. Y., assignor to General Electric Company, a corporation of New York Application April 30, 1946, Serial No. 666,029

2 Claims. (Cl. 175—183)

My invention relates to high frequency systems, and particularly to component elements used in such systems. It is a primary object of my invention to provide new and improved means and methods of testing high frequency elements to determine their reactance characteristics.

In testing certain types of high frequency electrical components, such as probes, gaseous switches, resonant windows, and other elements which cause reflected waves and which are used in high frequency transmission channels, such as wave guides, it is known that information concerning the reactance characteristics of the components may be obtained by comparing the phase angle of a voltage wave reflected from the component with that obtained from a standard component. The component to be tested is placed in a transmission channel and the relative intensity of the reflected wave is measured at a predetermined position in the channel, such a measurement indicating whether or not the component being tested is different from the standard component. However, in order to determine whether or not the reactance of the component is inductive or capacitive with respect to a standard component, heretofore it has been necessary to vary the position of a high frequency pick-up probe employed for measuring the reflected wave. Such movement not only requires time, but introduces an inaccuracy due to the inability to reset the probe exactly at the previous predetermined position.

Accordingly, it is a further object of my invention to provide new and improved testing apparatus for high frequency components which is simple and accurate in operation and requires a minimum amount of adjustment to determine the characteristics of high frequency components.

One of the features of my invention consists in employing a wave guide in which a component to be tested is connected and utilizing a high frequency pick-up probe positioned at a point of the wave guide which corresponds to the known reflection point of a component of desired characteristics and which is stationary at that point. A disturbing probe is provided for selective insertion at a point intermediate the high frequency probe and the component to provide an indication of the reactance characteristic of the component being tested.

For a better understanding of my invention, reference may be had to the following description taken in connection with the accompanying drawing and its scope will be pointed out in the appended claims. Fig. 1 illustrates high frequency testing apparatus suitably embodying my invention and Fig. 2 is a perspective view of a high frequency component of the type described in connection with the apparatus of Fig. 1.

Referring now to the accompanying drawing, Fig. 1 illustrates a high frequency transmission channel which may comprise, for example, a metallic wave guide 1 illustrated as of rectangular cross-section and having side walls formed of a suitable material. A high frequency wave, such as a $TE_{01}$ wave, may be propagated along the wave guide 1 by any suitable source, such as the source 2, connected between corresponding points of opposite walls of wave guide 1. At its opposite end, the wave guide 1 may be terminated in any suitable manner, such as by non-reflecting load 3. A high frequency component 4 to be tested and which is illustrated as a gaseous discharge cell, is connected across the wave guide at a point adjacent the load 3. At a point intermediate the source 2 and the component 4, there is connected a radio frequency pick-up system which comprises a probe 5 which extends a short distance into the wave guide and which is connected to the inner conductor 6 of a coaxial transmission line having an outer conductor 7. The transmission line supplies high frequency energy picked up by the probe 5 to a conventional crystal rectifier 8 which may be, for example, of the germanium crystal type. The currents rectified by the crystal 8 are supplied to a microammeter 9. The pick-up probe and transmission line 6, 7 may be mounted on a plate 10 which covers a slot 11 in the top wall of wave guide 1 through which the probe 5 projects. In this fashion, the probe may be varied in position until the desired point of insertion is obtained. Also supported by the top wall of the wave guide 1 at points intermediate the pick-up probe 5 and the component 4 are a pair of tuning stubs 12, 13. Each of the stubs 12, 13 comprises a probe 14 which is supported by a tubular sleeve 15. The probe 14 may be inserted a short distance into the wave guide 1 through suitable apertures (not shown) and clamped in position by means of a clamping screw 16 fastened to the tubular member 15.

In the portion of the wave guide intermediate the component 4 and the right-hand end there is disposed a terminating load 3 which comprises a strip 17 of resistance material which extends from the bottom wall of the wave guide upward into the region of maximum electric field intensity. So located, the strip 17 serves to dissipate any energy which passes through the high frequency component 4 which is being tested.

In the operation of the portion of the testing apparatus thus far described, a high frequency wave of known characteristics is propagated down the wave guide 1 from the end at which the source 2 is connected. The component 4 may reflect a certain amount of the incident wave, while the portion of the wave which passes through the component 4 is dissipated in the terminating load 17. The energy reflected by component 4 is picked up by the high frequency probe 5 which functions as a standing wave detector to give an indication on the meter 9 of the intensity of the reflected wave at the position of the probe 5 in the wave guide by determining the amount of power of the wave at this point of the guide. When the component 4 is a standard component of known characteristics, the system may be tuned or adjusted either by positioning of the probe 5 in the wave guide or by adjustment of the tuning stubs 12, 13 to control the amount of reactance coupled to the wave guide so that the power reading of the meter 9 is a minimum. This minimum reading indicates that the probe 5 is positioned at a null point of the standing wave. When a component to be tested is connected across the wave guide, the power reading indicated by the meter 9 is not a minimum, but is somewhat greater if the energy reflected by the component being tested differs from that of the standard component. This difference in reading indicates a difference in the phase angle of the standard and unknown components, that is, that the reactance of the unknown component is not the exact desired value. However, the question of whether or not the phase angle difference is leading or lagging, which in turn is determined by whether or not the unknown component is more inductive or capacitive than the standard component, cannot be determined unless the probe 5 is moved from its original null position. Movement of the probe 5 from the original null position changes the power reading and, depending upon whether the change is an increase or decrease in value, indicates whether the component being tested is more inductive or more capacitive than the standard component.

Movement of the probe 5 in the manner described in testing a component not only consumes considerable time, but introduces inaccuracies in determining the amount of variation from the standard component because of the inability to reset the probe 5 exactly on the original null point determined when a standard component is tested. Accordingly, I provide means to compare the characteristics of a component being tested with the characteristics of a standard component without resorting to movement of the radio frequency pick-up probe 5. This means comprises a disturbing probe 18 which is positioned between the radio frequency probe 5 and the component 4 being tested and which is adapted to be inserted into the wave guide 1. The disturbing probe 18 comprises a rod 19 which may be either metallic or formed of a dielectric material and which is adapted to be inserted in a slot 20 in the upper wall of the wave guide 1. The rod 19 is supported by means of a housing 21 and is biased upwardly to a position external to the wave guide by means of a spring 22 which is positioned between an apertured bottom wall 23 of the housing 21 and a disk 24 attached to the rod 19.

If it is assumed that the apparatus has been previously adjusted by means of the stubs 12, 13 to obtain a minimum reading on meter 9 when a standard component is being tested, the testing of an unknown component may be easily accomplished by noting the amount of reading on meter 9 when that component is connected across the wave guide. Such a reading indicates the difference in reactance value of the standard or unknown components and by suitable calibration of the meter 9 the value of the difference may be shown. The characteristic of the difference in reactance, that is, whether the unknown component is more inductive or more capacitive than the standard is determined by depressing the rod 19 and moving the probe along the slot 20 to locate the point at which a small change of the depth of insertion of the probe causes the detected high frequency power either to increase or to decrease. When the pressure is removed from the top of the rod 19, the spring 22 withdraws the disturbing probe from the wave guide. Moreover, the distance between the disk 24 and the bottom wall 23 preferably is sufficiently small that no considerable disturbance of the standing wave in the wave guide is caused, but merely a sufficient amount to provide either an increase or a decrease in reading on the meter 9.

While my system is suitable for testing many types of high frequency components, one such type of component is illustrated in Fig. 2. The component there shown comprises a gaseous discharge tube which consists of a short section 25 of a metallic wave guide having transverse metallic end walls 26, 27. These end walls preferably are identical in structure and comprise a metallic member having an aperture 28 across which is sealed a glass window 29. The region between the walls 26, 27 may be evacuated by means of tubulation 30, and, subsequently, filled with gas. Gaseous discharge devices of this type are described and claimed in the copending application of Milan D. Fiske, Serial No. 602,471, filed June 30, 1945, now Patent No. 2,422,190, issued June 17, 1947. Such a device is adapted to be inserted in a wave guide to effect a switching operation in accordance with the intensity of an incident high frequency wave. The reactance of the device depends in part upon the thickness of the glass windows 29. Accordingly, in testing the device, it is desirable to measure its impedance to determine whether or not the windows are of desired thickness or require grinding to obtain a desired impedance value.

While I have described and illustrated my improved testing apparatus as being employed with a transmission channel of the wave guide type and as being used for testing a particular type of high frequency component, it is apparent that the apparatus and principles of operation thereof are suitable for use in connection with other types of transmission channels such as coaxial transmission lines and may be used for testing other types of high frequency components, such as high frequency probes, windows, tubes, or other elements which cause a disturbance of a wave being propagated along the transmission channel.

While I have shown and described my invention as applied to one particular embodiment thereof, it will be obvious to those skilled in the art that changes and modifications may be made without departing from my invention and I aim in the appended claims to cover all such changes and modifications as fall within the true spirit and scope of my invention.

What I claim as new and desire to secure by Letters Patent of the United States is:

1. A high frequency testing device comprising a section of wave guide, means connected across one end of said guide for propagating a high frequency wave along said guide, energy dissipating means connected across said guide at its other end, said guide being adapted to have a high frequency device to be tested connected thereacross in the vicinity of said energy dissipating means, means for measuring the intensity of standing waves in said guide connected to said guide at a point intermediate said propagating means and the device to be tested, means spaced longitudinally of said guide intermediate said measuring means and said device for adjusting the propagation characteristics of said guide to obtain a minimum indication of standing wave when a standard device is being tested, a probe arranged to be inserted in said guide at a point intermediate said measuring means and said device, and means for normally maintaining said probe in a position external to said guide, said probe when inserted into said guide varying the measurement at said point to indicate the reactance characteristic of the device being tested.

2. A high frequency device comprising a section of wave guide, means connected across said guide at one of its ends for propagating a high frequency wave along said guide, energy dissipating means connected across said guide at its other end, said guide being adapted to have a high frequency device to be tested inserted in said guide in the vicinity of said energy dissipating means, means connected to said guide intermediate said propagating means and the device to be tested for measuring the intensity of the standing waves in said guide, said means comprising a first probe extending into said guide and voltage indicating means connected to said probe, means comprising a second probe extending into said guide at a point intermediate said propagating means and a device to be tested for adjusting the propagational characteristics of said guide to obtain a minimum indication of standing wave when a standard device is being tested, and means connected to said guide for indicating the reactance characteristic of a device being tested, said means comprising an additional probe supported on said guide at a point intermediate said measuring means and a device being tested, means normally supporting said probe in a position wholly external to said guide, and means for permitting insertion of said additional probe into said guide to disturb the transmission of high frequency energy between said energy propagating means and the device being tested.

WILLIAM T. POSEY.

REFERENCES CITED

The following references are of record in the file of this patent:

UNITED STATES PATENTS

| Number | Name | Date |
| --- | --- | --- |
| 2,403,289 | Korman | July 2, 1946 |
| 2,404,797 | Hansen | July 30, 1946 |
| 2,423,383 | Hershberger | July 1, 1947 |
| 2,423,526 | Sontheimer et al. | July 8, 1947 |